(12) United States Patent
Veit et al.

(10) Patent No.: US 9,790,999 B2
(45) Date of Patent: Oct. 17, 2017

(54) CLUTCH APPARATUS WITH LOCKABLE ACTUATING DEVICE

(71) Applicant: BorgWarner Inc., Auburn Hills, MI (US)

(72) Inventors: Matthias Gerhard Veit, Oftersheim (DE); Alexander Moser, Ketsch (DE); Richard Baeumler, Brunnen (DE)

(73) Assignee: BorgWarner Inc., Auburn Hills, MI (US)

( * ) Notice: Subject to any disclaimer, the term of this patent is extended or adjusted under 35 U.S.C. 154(b) by 44 days.

(21) Appl. No.: 14/786,266

(22) PCT Filed: Apr. 30, 2014

(86) PCT No.: PCT/US2014/036033
§ 371 (c)(1),
(2) Date: Oct. 22, 2015

(87) PCT Pub. No.: WO2014/182515
PCT Pub. Date: Nov. 13, 2014

(65) Prior Publication Data
US 2016/0076601 A1    Mar. 17, 2016

(30) Foreign Application Priority Data
May 10, 2013 (DE) .................. 10 2013 008 071

(51) Int. Cl.
F16D 25/0638 (2006.01)
F16D 25/12 (2006.01)
F16D 23/14 (2006.01)

(52) U.S. Cl.
CPC ............. *F16D 25/12* (2013.01); *F16D 23/14* (2013.01); *F16D 25/0638* (2013.01); *F16D 25/126* (2013.01)

(58) Field of Classification Search
None
See application file for complete search history.

(56) References Cited

U.S. PATENT DOCUMENTS 2,639,013 A * 5/1953 Meschia ................ F16D 13/54
                                                  192/109 B
3,047,115 A * 7/1962 Lee ..................... F16D 25/0638
                                                  192/110 S (Continued)

FOREIGN PATENT DOCUMENTS

| EP | 0728958 A1 | 8/1996 |
| JP | 05272554 A | 10/1993 |
| JP | 2012197851 A | 10/2012 |

OTHER PUBLICATIONS

International Search Report and Written Opinion dated Aug. 18, 2014; Application No. PCT/US2014/036033 ; 13 pages.

*Primary Examiner* — Robert A Siconolfi
*Assistant Examiner* — Ryan Dodd
(74) *Attorney, Agent, or Firm* — BrooksGroup

(57) ABSTRACT

A number of variations may include a clutch apparatus having at least one clutch and having an actuating device for actuating the clutch, the actuating device being movable from an opening position, in which the clutch is open, into a closing position, in which the clutch is closed. The actuating device can be locked with form-fit action in the closing position or opening position.

18 Claims, 6 Drawing Sheets

(56) References Cited

U.S. PATENT DOCUMENTS

Figure 1:
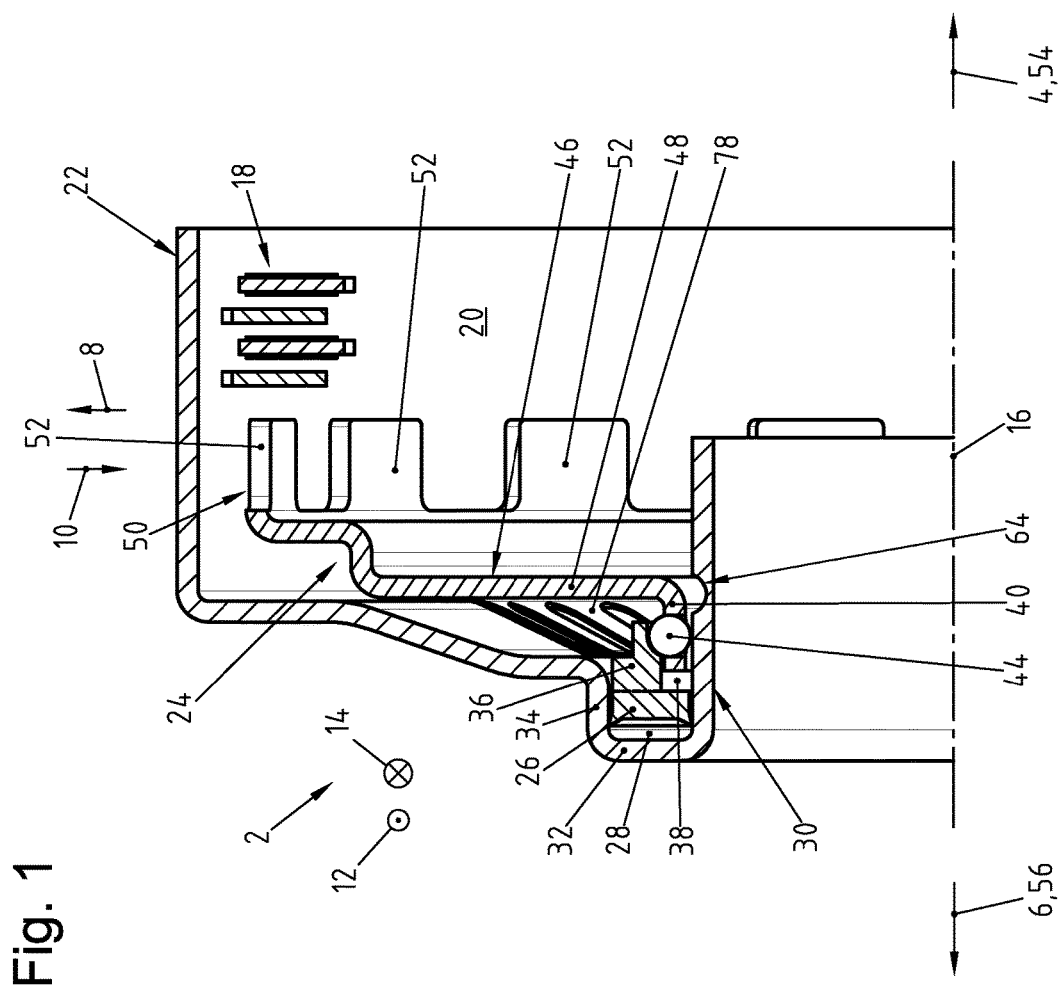

| | | | | |
|---|---|---|---|---|
| 7,320,391 B2 * | 1/2008 | Zagrodzki | ............ | F16D 25/0638 |
| | | | | 192/70.14 |
| 8,074,778 B2 | 12/2011 | Jayaram et al. | | |
| 8,561,640 B2 * | 10/2013 | McConnell | ............. | F16D 25/12 |
| | | | | 137/523 |
| 2008/0314711 A1 * | 12/2008 | Jayaram | .............. | F16D 25/0638 |
| | | | | 192/85.34 |
| 2012/0241280 A1 | 9/2012 | Nakano et al. | | |

\* cited by examiner

CLUTCH APPARATUS WITH LOCKABLE ACTUATING DEVICE

This application claims the benefit of PCT Application Serial No. 2014/036033 filed Apr. 30, 2014, and German Patent Application Serial No. DE 102013008071.1 filed May 10, 2013.

The present invention relates to a clutch apparatus having at least one clutch and having an actuating device for actuating the clutch, the actuating device being movable from an opening position, in which the clutch is open, into a closing position, in which the clutch is closed.

Clutch apparatuses having a clutch and having a hydraulic actuating device for actuating the clutch are known from practice. The actuating device can be moved by means of the hydraulics from an opening position, in which the clutch is open, into a closing position, in which the clutch is closed. To hold the clutch, which is of normally open form, in its closed state, the actuating device must be held in its closing position by maintaining the hydraulic pressure. By contrast, in the case of a normally closed clutch, the hydraulic pressure must be maintained in order to hold the actuating device its opening position.

It is an object of the present invention to provide a clutch apparatus having a clutch and having an actuating device for actuating the clutch, in which the actuating device can be moved into the closing position or opening position, and held in the respective position, with little expenditure of energy.

The clutch apparatus according to the invention has at least one clutch. The clutch is preferably in the form of a multiplate clutch and/or in the form of a wet-running clutch. The clutch may be either in the form of a normally open clutch or in the form of a normally closed clutch, which returns into the opening position or remains in the opening position when not actuated. The clutch is assigned an actuating device for actuating the clutch. The actuating device is preferably in the form of a hydraulic actuating device for the hydraulic actuation of the clutch. The actuating device can be moved from an opening position, in which the actuating device interacts with the clutch in such a way that the clutch is open, into a closing position, in which the actuating device interacts with the clutch in such a way that the clutch is closed. To hold the actuating device in the closing position or the clutch in the closed state, or to hold the actuating device in the opening position or the clutch in the open state, the force introduced into the actuating device does not need to be maintained or does not need to be maintained fully, and instead, the actuating device is designed such that it can be locked with form-fit action in the closing position or opening position. In the case of a hydraulic actuating device, this would for example mean that, after the closing position or opening position has been reached, the hydraulic pressure for moving the actuating device into the closing position or opening position does not need to be maintained, or only needs to be maintained with lesser magnitude, in order to hold the actuating device in the closing position or opening position, especially since the locking with form-fit action causes the actuating device to be held in the closing position or opening position.

In a preferred embodiment of the clutch apparatus according to the invention, the actuating device is designed so as to be locked automatically as a result of movement of the actuating device into the closing position or opening position, in order to make the handling of the clutch apparatus easier.

In a particularly preferred embodiment of the clutch apparatus according to the invention, the actuating device is assigned at least one movable locking element. The movable locking element is for example a roller body, for example a ball or a roller, or a sliding body, that is to say for example a lock that is displaceable with sliding action. The locking element mentioned herein may also be referred to as clamping element. Independently of the respective design variant of the movable locking element, the locking element can be moved from a release position into a locking position, in which the actuating device is locked, and vice versa. Even though reference is always made herein to at least one movable locking element, it is nevertheless preferable for at least two or three movable locking elements to be provided, wherein it is moreover preferable for the at least two or three movable locking elements to be arranged along a circle and/or in the circumferential direction so as to be spaced apart uniformly from one another along said circle, especially since this makes it possible to realize particularly secure and uniform locking of the actuating device in the closing position or opening position.

In a further particularly preferred embodiment of the clutch apparatus according to the invention, the locking element can be moved from the release position into the locking position by means of an actuating force that can be or is imparted by the actuating device. This has the advantage that, for the movement of the locking element from the release position into the locking position, no additional actuating device, for example further hydraulics or a motor drive, needs to be provided for the locking element, whereby the construction of the clutch apparatus is made simpler.

In one advantageous embodiment of the clutch apparatus according to the invention, the locking element is arranged between a first force-transmitting element and a second force-transmitting element of the actuating device. Said force-transmitting elements serve for the transmission of the actuating force of the actuating device or of a restoring force for the restoring movement of the clutch. The two force-transmitting elements between which the locking element is arranged, that is to say the first force-transmitting element and the second force-transmitting element, are movable in a movement direction, the movement direction of the two force-transmitting elements preferably corresponding to the axial directions of the clutch apparatus. Accordingly, it is for example possible for the first and second force-transmitting elements to be moved or displaced both in one axial direction of the clutch apparatus and also in the opposite, other axial direction of the clutch apparatus.

In a further preferred embodiment of the clutch apparatus according to the invention, in the release position of the locking element, the first force-transmitting element and the second force-transmitting element can be or are supported on one another in the movement direction of the force-transmitting elements via the locking element. Consequently, in the release position of the locking element, a force can be transmitted in the movement direction from one force-transmitting element to the other force-transmitting element via the locking element. Also, in the release position of the locking element, the force-transmitting elements are coupled in such a way that a movement of one force-transmitting element in the movement direction results in a movement of the other force-transmitting element in the same movement direction, such that this can also be referred to as a coupling of the movements of the two force-transmitting elements by means of the locking element.

In a further preferred embodiment of the clutch apparatus according to the invention, in the locking position of the locking element, the first force-transmitting element and the second force-transmitting element are decoupled from one another in relation to the movement direction. Consequently, in this embodiment, it is possible for the two force-transmitting elements to be displaced relative to one another in the movement direction without a movement of one force-transmitting element in the movement direction resulting in a movement of the other force-transmitting element in the movement direction. With this embodiment, it is possible for at least one part of the actuating device to be locked and decoupled from the rest of the actuating device without all of the elements of the actuating device having to be locked in a predetermined position in order for said actuating device to be locked in the closing position or opening position.

In a particularly advantageous embodiment of the clutch apparatus according to the invention, in the locking position of the locking element, the first force-transmitting element can be moved relative to the second force-transmitting element into a holding position in which the locking element can be or is supported on the first force-transmitting element such that the locking element is retained in its locking position. It is ensured in this way that, after the locking position has been reached and after the relative movement of the first force-transmitting element with respect to the second force-transmitting element, the locking element is securely retained in its locking position such that the actuating device is locked in the closing position or opening position and the clutch is thereby closed or open. In order, in the case of this embodiment, to ensure that the first force-transmitting element can remain in the holding position with little expenditure of force or even no expenditure of force, the locking element, in its locking position, can be or is supported on the first force-transmitting element preferably perpendicular to the movement direction and/or without generating a supporting force acting on the first force-transmitting element in the movement direction.

For an easy restoring movement of the first force-transmitting element out of its holding position again relative to the second force-transmitting element, provision is made, in a further preferred embodiment of the clutch apparatus according to the invention, of a restoring element, it being possible for the first force-transmitting element to be moved relative to the second force-transmitting element into the holding position counter to the restoring force of said restoring element. The restoring element may for example be formed by a spring element, for example a plate spring. Here, the restoring force of the restoring element should be selected so as to be lower than the force transmitted by the first force-transmitting element to move the actuating device into the closing position or opening position, in order that, in the holding position of the first force-transmitting element, only a low force has to be imparted in order to hold the first force-transmitting element in its holding position.

In a further advantageous embodiment of the clutch apparatus according to the invention, the first force-transmitting element and the second force-transmitting element are movable relative to a support element in the movement direction. In a further preferred embodiment of the clutch apparatus according to the invention, in the locking position of the locking element, the second force-transmitting element can be or is supported on the support element in the movement direction via the locking element. Consequently, in this embodiment, locking of the actuating device with form-fit action in the closing position or opening position is realized by virtue of only a part of the actuating device, specifically the second force-transmitting element, being locked with form-fit action. The second force-transmitting element is preferably that force-transmitting element which is arranged in the force transmission path between the locking element and the clutch. As already indicated above, it is possible, owing to the locking of the second force-transmitting element, for decoupling from the first force-transmitting element to be realized, such that the latter can for example be moved into its advantageous holding position relative to the second force-transmitting element and/or held in its position substantially without force.

In a further advantageous embodiment of the clutch apparatus according to the invention, the support element has, in relation to the movement direction, a first support section, on which the locking element can be or is supported so as to be retained in its release position, and a second support section, in which there is provided at least one depression into which the locking element can be moved so as to reach the locking position. By means of the first support section, it is thus ensured that the locking element remains securely in its release position over a certain range in which it is intended for the two force-transmitting elements to be supportable, or supported, on one another. By contrast, the second support section, with the abovementioned depression which may for example be a hollow or a cutout, ensures that the locking element can be moved from the release position into the locking position. In this embodiment, it is preferable for the locking element, when in the region of the second support section, that is to say for example when it reaches the second support section, to be moved or displaced into the depression as a result of a movement of the first force-transmitting element relative to the second force-transmitting element in the movement direction. For this purpose, the first force-transmitting element has, for example, a corresponding guide which, during a movement of the first force-transmitting element relative to the second force-transmitting element in the movement direction, forces the locking element into the locking position within the depression.

In a further preferred embodiment of the clutch apparatus according to the invention, a ramp for displacing the locking element from the release position into the locking position is provided on the first force-transmitting element. The ramp preferably has a ramp section, to be referred to hereinafter as first ramp section, on which the locking element, when in the release position, can be or is supported in the movement direction if appropriate in areal or linear fashion in order to ensure secure support of the mutually assigned force-transmitting elements on one another in the movement direction. Accordingly, the first ramp section may preferably have a circle-segment-shaped contour.

The first ramp section mentioned above may basically already be sufficient for displacing the locking element into its locking position in a suitable manner when the first force-transmitting element is moved or displaced. However, to firstly realize secure areal or linear support of the locking element on the first ramp section when the locking element is arranged in the release position, and to secondly realize a simple transition of the locking element from the release position into the locking position, it is provided in a further preferred embodiment of the clutch apparatus according to the invention that the above-mentioned ramp has a second ramp section, which follows the first ramp section and on which the locking element can be or is supported if appropriate in linear or punctiform fashion and along which the locking element is movable from the release position into the locking position. The contour of the second ramp section preferably differs from the contour of the first ramp section, wherein it is furthermore preferable for the second ramp section to have a rectilinear contour or a contour that deviates from that of a circle segment.

In a further particularly advantageous embodiment of the clutch apparatus according to the invention, the second force-transmitting element has an annular part with at least two cutouts in which the locking elements are received so as to be spaced apart from one another in the circumferential direction and optionally so as to be movable in the radial direction. It is preferable here for the cutouts in the annular part to be arranged so as to be spaced apart from one another or distributed uniformly in the circumferential direction of the annular part in order to realize a corresponding arrangement of the locking elements relative to one another, which—as already indicated above—has the result that uniform locking or support can be realized. The indicated mobility of the locking elements within the cutouts in the radial direction moreover permits the movement of the locking elements from the release position into the locking position and vice versa. Moreover, the annular part ensures a compact, easily assembled construction of the clutch apparatus in the region of the locking elements.

In a further advantageous embodiment of the clutch apparatus according to the invention, the annular part is formed in one piece with a clutch load-exertion element of the actuating device or is fastened to the clutch load-exertion element. The clutch load-exertion element may be for example an engagement or disengagement plate on which there are preferably provided actuating fingers for actuating the clutch. The clutch load-exertion element is in this case preferably to be understood to mean that element of the actuating device which acts directly on the clutch. Owing to the single-piece form of the annular part together with the clutch load-exertion element, or the fastening of the annular part to the clutch load-exertion element, it is possible for the annular part to be assembled together with the clutch load-exertion element, optionally even already together with the locking elements provided on the annular part, which reduces production expenditure. As an alternative to this, however, the annular part may also be formed separately from the clutch load-exertion element of the actuating device, wherein between the second force-transmitting element and the clutch load-exertion element there is a corresponding operative connection for the transmission of force and/or movement between the second force-transmitting element and the clutch load-exertion element.

In a further preferred embodiment of the clutch apparatus according to the invention, the locking element is preloaded into the release position. It is preferable here for the locking element to be preloaded into the release position under centrifugal force action. In this design variant, it is thus possible for the locking elements to be forced or preloaded into the release position owing to the centrifugal force that acts on the locking elements during the operation of the clutch apparatus. This is preferable in particular in embodiments in which the locking elements, when in the locking position, are arranged offset inward in the radial direction of the clutch apparatus in relation to the release position. It is however alternatively also possible for the locking element to be preloaded into the release position by means of a spring device. This is advantageous in particular in embodiments in which the locking element, when in the locking position, is arranged offset outward in the radial direction of the clutch apparatus in relation to the release position.

To ensure particularly reliable and fault-free functioning of the locking elements, it is provided in a further preferred embodiment of the clutch apparatus according to the invention that said locking elements are of spherical form or in the form of balls.

In a further advantageous embodiment of the clutch apparatus according to the invention, at least two locking elements are provided, wherein—as already indicated—it is advantageous for at least three locking elements to be provided. In this embodiment, the at least two locking elements are preferably connected to one another in annular form by means of spring elements of the spring device for preloading the locking elements into the release position. It is particularly preferable here for said spring elements to be formed by tensile and/or helical springs, which consequently generate a preload of the locking elements inward in the radial direction of the clutch apparatus, such that the locking elements are preloaded inward in the radial direction into the release position. As already indicated above, this is expedient in particular in embodiments of the clutch apparatus in which the locking elements, when in their locking position, are arranged offset outward in the radial direction in relation to the release position.

To counteract wear in the region of the locking elements, of the clutch and/or of the force-transmitting elements, and the associated reduction in the closing force or opening force of the actuating device in the closing position or opening position, it is provided in a further particularly preferred embodiment of the invention that the clutch apparatus has a wear compensation device.

In a further advantageous embodiment of the clutch apparatus according to the invention, the wear compensation device is elastically deformable in order to realize wear compensation and/or is elastically deformed in the locking position of the locking element.

In a further preferred embodiment of the clutch apparatus according to the invention, the wear compensation device is arranged in the force transmission path between the locking element and the clutch. It has also proven to be advantageous here for the wear compensation device to be formed by a clutch load-exertion element, which is elastically deformable, resilient and/or formed in the manner of a plate spring, of the actuating device. As already indicated above, the clutch load-exertion element may for example be an engagement or disengagement plate which is operatively connected to the second force-transmitting element, wherein, in the case of this design variant, it is preferable for the second force-transmitting element to be formed separately from the clutch load-exertion element of the actuating device.

Figure 2:
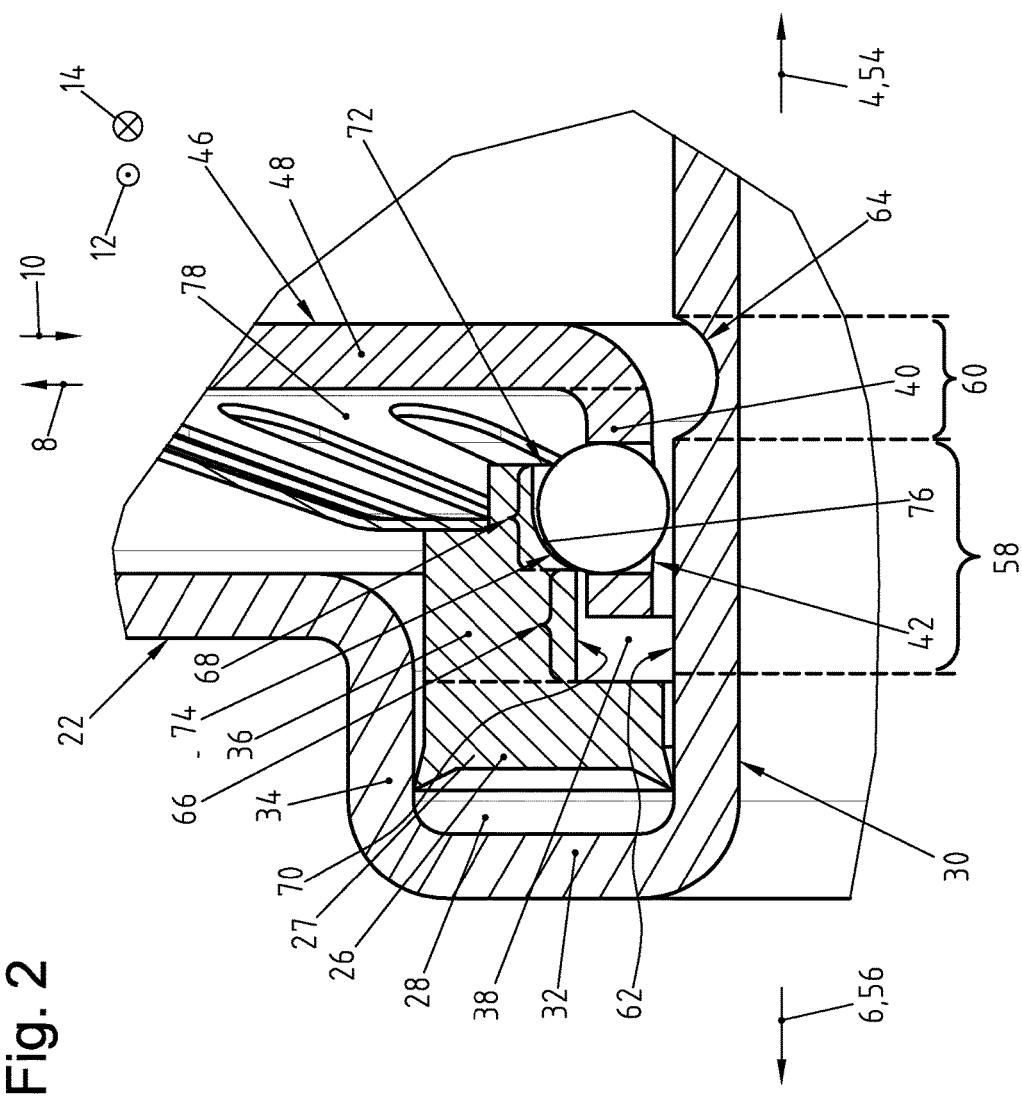
Figure 3:
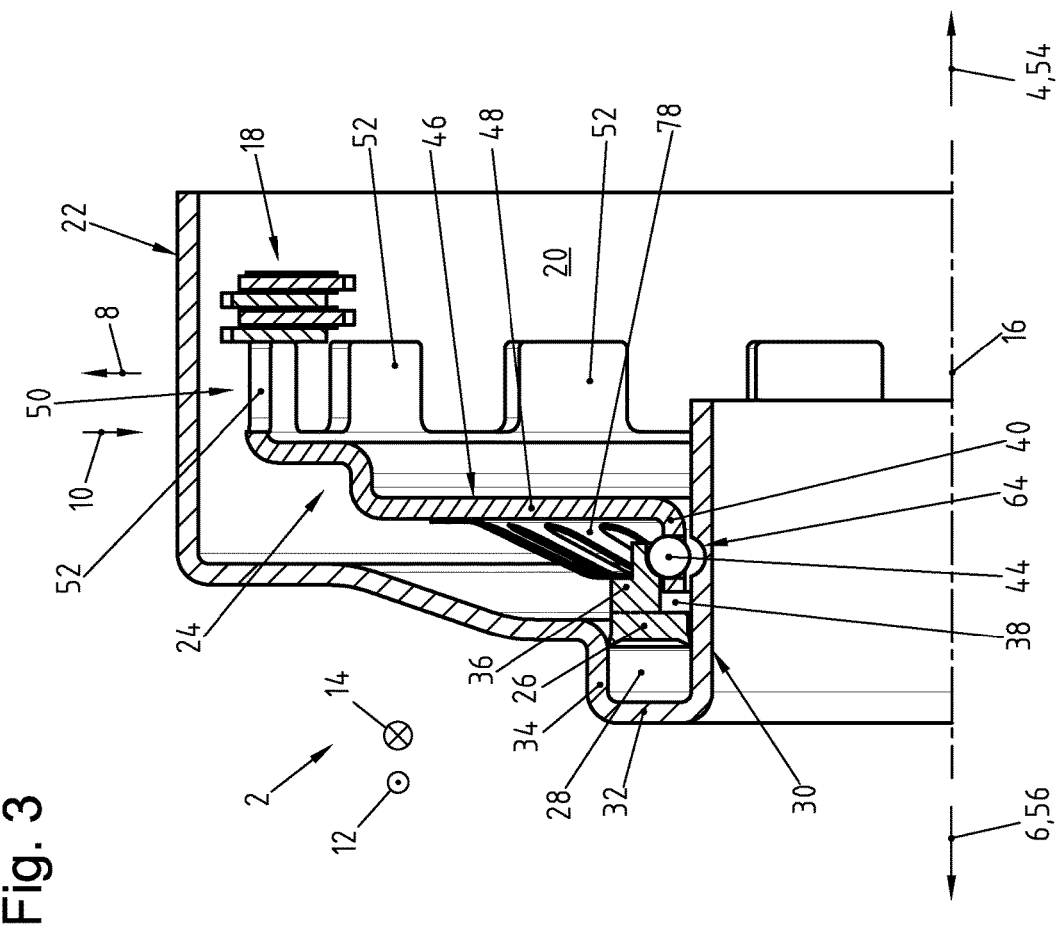
Figure 4:
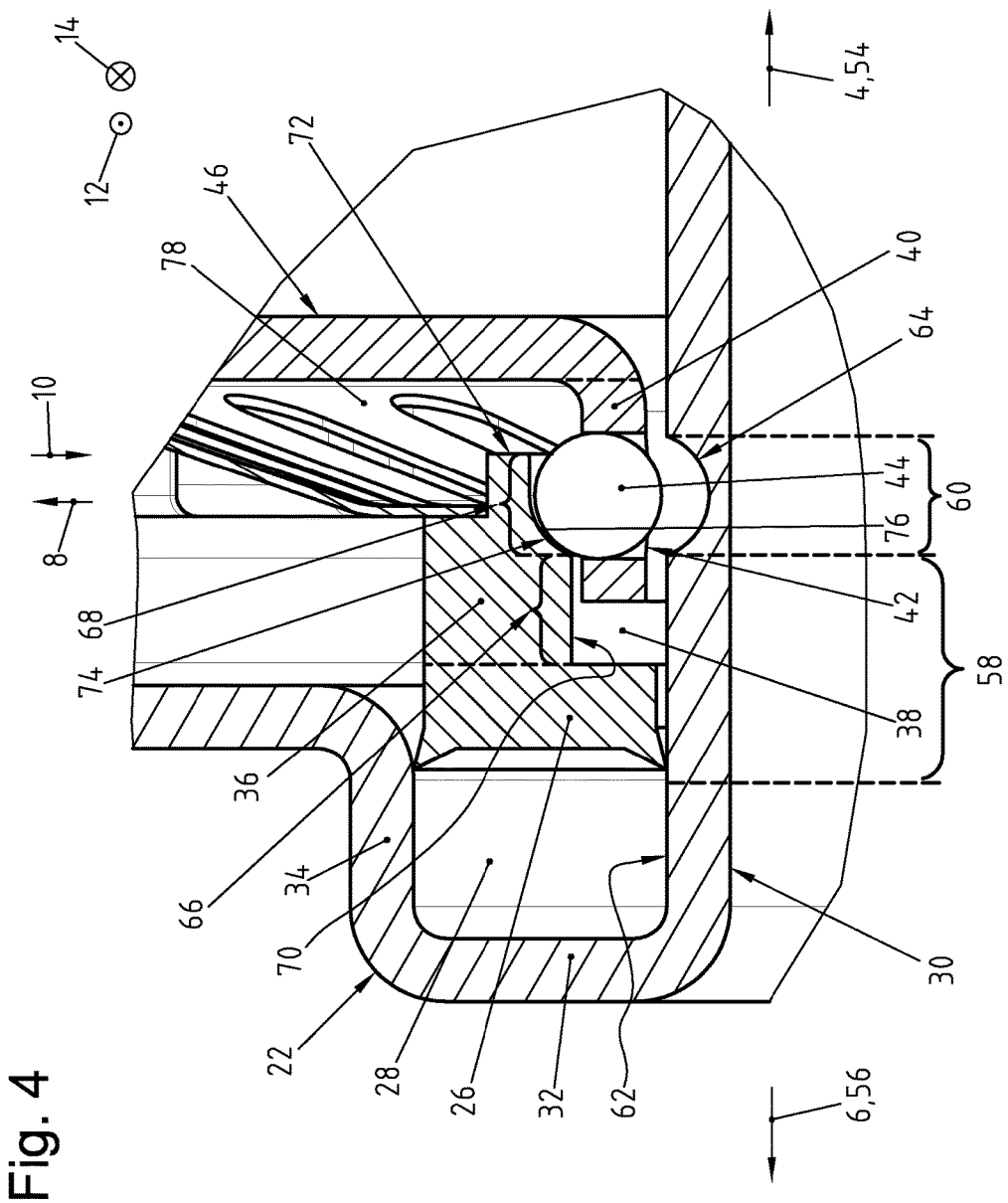
Figure 5:
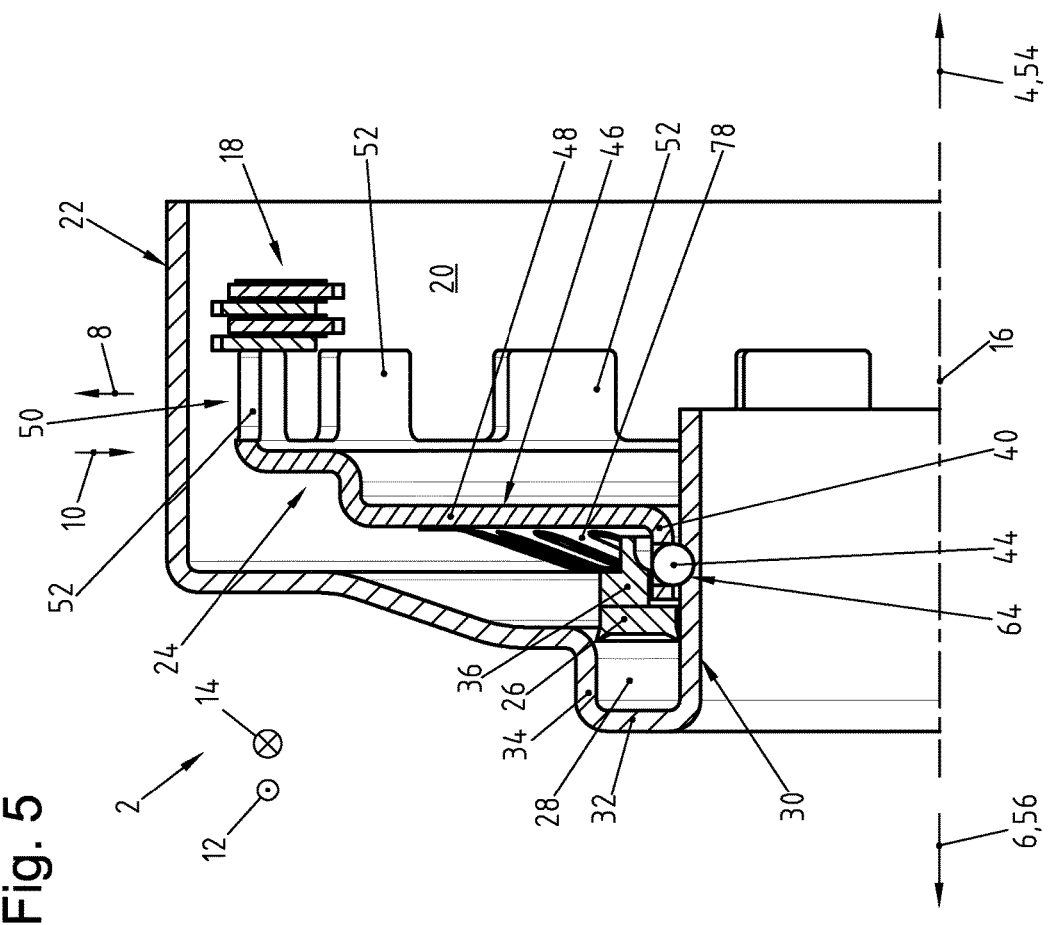
Figure 6:
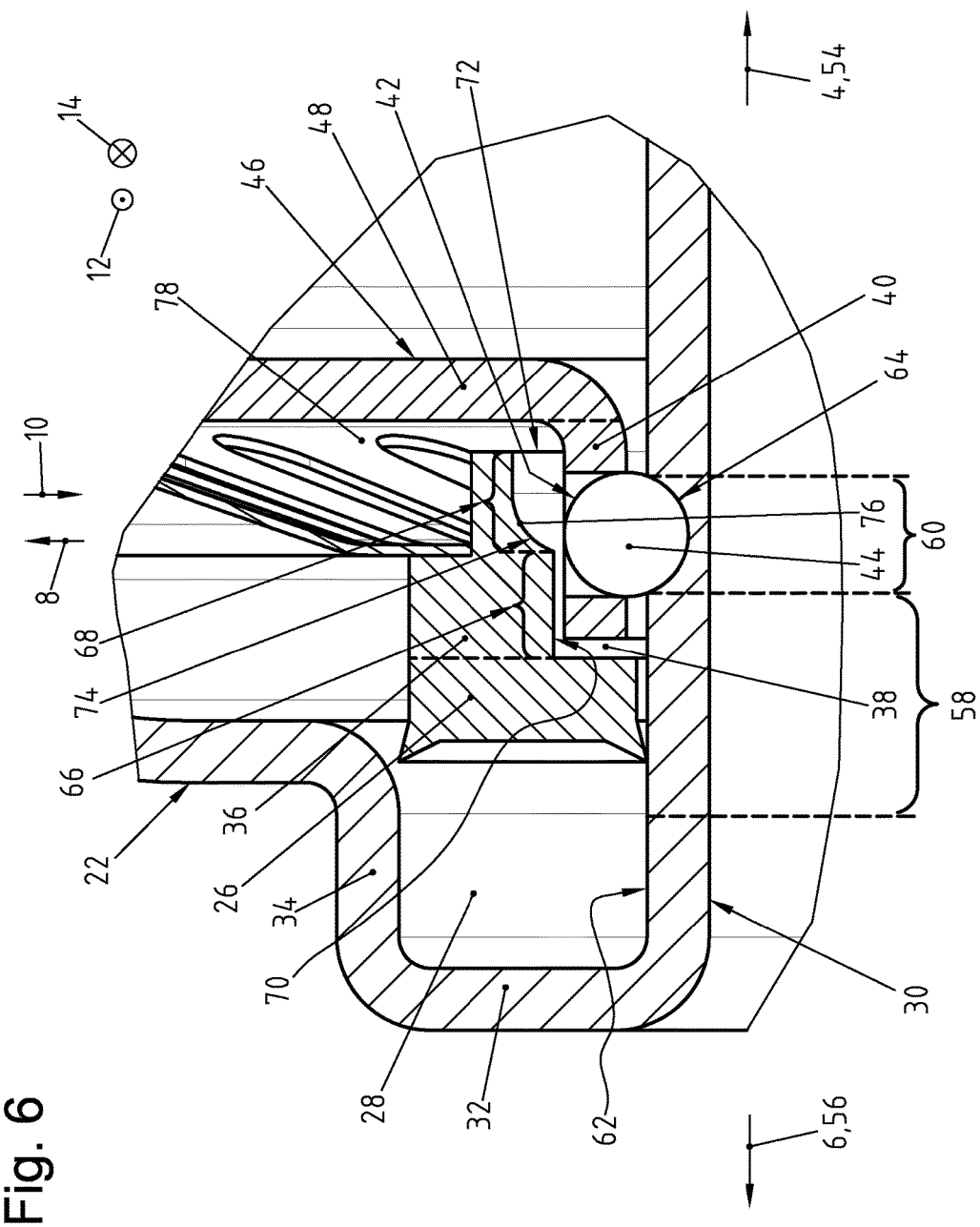

The invention will be explained in more detail below on the basis of an exemplary embodiment and with reference to the appended drawings. In the drawings:

FIG. 1 shows a partial side view of an embodiment of the clutch apparatus according to the invention with the actuating device in the opening position and the locking element in the release position, FIG. 2 shows an enlarged detail of FIG. 1 in the region of the locking element, FIG. 3 shows the clutch apparatus of FIG. 1 with the actuating device in the closing position and the locking element in the release position, FIG. 4 shows an enlarged detail of FIG. 3 in the region of the locking element, FIG. 5 shows the clutch apparatus from FIGS. 1 and 3 with the actuating device in the closing position, the locking element in the locking position and the first force-transmitting element in the holding position, and FIG. 6 shows an enlarged detail of FIG. 5 in the region of the locking element.

FIG. 1 shows an embodiment of the clutch apparatus 2 according to the invention. The mutually opposite axial directions 4, 6, the mutually opposite radial directions 8, 10 and the mutually opposite circumferential directions 12, 14 of the clutch apparatus 2 are indicated on the basis of corresponding arrows, with the axis of rotation 16 of the clutch apparatus 2 extending in the axial directions 4, 6.

The clutch apparatus 2 has at least one clutch 18, which in FIG. 1 is merely indicated on the basis of a plate pack composed of inner and outer plates. The clutch 18 is arranged within a wet chamber 20 which is surrounded by a clutch housing 22. The clutch 18 illustrated here is consequently a wet-running clutch 18, more precisely a wet-running multiplate clutch. The clutch 18 is assigned an actuating device 24 which is in the form of a hydraulic actuating device, which serves for the actuation of the clutch 18, and which will be described in more detail below. The actuating device 24 can be moved from an opening position, which is shown in FIG. 1 and in which the clutch 18 is open, into a closing position, which is shown in FIG. 5 and in which the clutch 18 is closed and the plates of the plate pack of the clutch 18 are pressed together in the axial direction 4, 6 in order to realize a frictionally engaging connection. The clutch 18 illustrated here is a normally open clutch 18, wherein restoring elements for the restoring movement of the actuating device 24 into the opening position shown in FIG. 1 have not been illustrated. Restoring elements of said type could for example be in the form of restoring springs, helical springs or plates springs.

The actuating device 24 has an actuating piston 26 including a piston head 27, the actuating piston 26 being displaceable in the axial direction 4, 6 and which in this case is in the form of an annular piston which is of encircling form in the circumferential direction 12, 14. The actuating piston 26 is assigned an annular pressure chamber 28 which can be charged with pressurized oil in order to displace the actuating piston 26 in the axial direction 4 and in order to transmit the actuating force via the actuating device 24 to the clutch 18. In the embodiment illustrated, the pressure chamber 28 is delimited to the inside in the radial direction 10 by a tubular support element 30 which extends in the axial direction 4, 6 and which is formed in one piece with the clutch housing 22. In the axial direction 6, the pressure chamber 28 is delimited by a radial section 32 of the clutch housing 22, whereas the pressure chamber 28 is delimited to the outside in the radial direction 8 by means of an axial section 34 of the clutch housing 22.

In the axial direction 4, the actuating piston 26 is followed by a first force-transmitting element 36 of the actuating device 24, wherein, in the embodiment illustrated, the first force-transmitting element 36 is formed in one piece with the actuating piston 26. It is however pointed out that the first force-transmitting element 36 may likewise be formed separately from the actuating piston 26, as indicated by means of the dashed line. A free space 38 which is of encircling form in the circumferential direction 12, 14 is formed between the first force-transmitting element 36 and the support element 30 in the radial direction 8, 10.

Within the free space 38 there extends a second force-transmitting element 40 formed as an annular part which is of encircling form in the circumferential direction 12, 14, wherein said annular part can also be referred to as being tubular. In the second force-transmitting element 40 formed by the annular part there are provided multiple cutouts 42 which are distributed in the circumferential direction 12, 14, wherein the cutouts 42 are spaced apart uniformly from one another in the circumferential direction 12, 14 and are formed so as to extend through in the radial direction 8, 10. In each of the cutouts 42 there is arranged a movable locking element 44, wherein in the embodiment illustrated, the locking elements 44 are of spherical form or are in the form of balls. The locking elements 44 are matched to the cutouts 42 such that, depending on the position of the actuating device 24, the locking elements 44 are movable in the radial direction 8, 10. The locking elements 44 will be discussed in more detail further below.

In the force transmission path of the actuating device 24, the second force-transmitting element 40 is followed by a clutch load-exertion element 46. As can be seen from the figures, the annular part that forms the second force-transmitting element 40 is formed in one piece with the clutch load-exertion element 46 of the actuating device 24, though it is alternatively also possible for the second force-transmitting element 40 formed by the annular part to be fastened to the clutch load-exertion element 46. In a further alternative, the second force-transmitting element 40 formed by the annular part may also be formed separately from the clutch load-exertion element 46, as indicated in FIG. 2 by means of the dashed line. The clutch load-exertion element 46 serves for the exertion of the actuating force of the actuating device 24 on the clutch 18, wherein the clutch load-exertion element 46 has a radial section 48 extending in the radial direction 8 and has an axial section 50 which adjoins the radial section 48 to the outside in the radial direction 8 and which extends in the axial direction 4. Here, the axial section 50 is formed by multiple actuating fingers 52 which are spaced apart from one another in the circumferential direction 12, 14, which actuating fingers project in the axial direction 4 in order, by means of the free ends, to press the plate pack of the clutch 18 together when the actuating device 24 is moved into the closing position according to FIG. 5.

The actuating piston 26, the first force-transmitting element 36, the locking elements 44 arranged between the first force-transmitting element 36 and the second force-transmitting element 40, the second force-transmitting element 40 and the clutch load-exertion element 46 are movable relative to the support element 30 in mutually opposite movement directions 54, 56, wherein, in the embodiment illustrated, the movement directions 54, 56 correspond to the axial directions 4, 6. In relation to the movement directions 54, 56, the support element 30 has a first support section 58, wherein the first support section 58 is followed in the movement direction 54 by a second support section 60. In the region of the first support section 58, the outer side 62, which points outward in the radial direction 8 and which faces toward the actuating device 24, is a cylindrical surface which is of encircling form in the circumferential direction 12, 14. A depression 64 which is of encircling form in the circumferential direction 12, 14 is formed in the outer side 62 of the support element 30 in the region of the second support section 60, which depression can consequently also be referred to as a groove-like depression 64. It would however alternatively also be possible for in each case one individual depression 64 to be provided for each of the locking elements 44.

The first force-transmitting element 36 which is formed in one piece with the actuating piston 26 has, in relation to the movement directions 54, 56, a first holding section 66 and a second holding section 68 which follows the first holding section 66 in the movement direction 54. The inner side 70, which points inward in the radial direction 10 and which thus faces toward the free space 38, of the first force-transmitting element 36 extends in the movement directions 54, 56 and in the circumferential directions 12, 14 in the manner of a cylinder. A depression 72 is provided in the inner side 70 of the first force-transmitting element 36 in the region of the second holding section 68, wherein the depression 72, like the depression 64, may be of encircling form in the circumferential direction 12, 14, and thus formed in the manner of a groove. It is alternatively likewise possible for multiple individual depressions 72 to be provided on the inner side 70 of the first force-transmitting element 36 in the region of the second holding section 68, which depressions are in each case assigned to one of the locking elements 44. The base of the depression 72 is at least partially formed in the manner of a ramp 74. Here, the ramp 74 has a ramp section 76 which has a circle-segment-shaped contour.

The functioning of the clutch apparatus 2 and further features thereof will be described in more detail below with reference to FIGS. 1 to 6.

In the case of the normally open clutch 18 illustrated, the actuating device 24 is situated in an opening position according to FIGS. 1 and 2, wherein the opening position may also be referred to as the initial position of the actuating device 24. To close the clutch 18, which is open in the initial position of the actuating device 24, the pressure within the pressure chamber 28 is increased in order to displace the actuating piston 26 in the movement direction 54. The force that acts in the movement direction 54 as a result is transmitted to the first force-transmitting element 36. In the opening position, shown in FIGS. 1 and 2, of the actuating device 24, the locking element 44 is situated in a release position.

In the release position, the locking element 44 can be or is supported inwardly in the radial direction 10 on the outer side 62 of the first support element 30 in the region of the first support section 58, such that the locking element 44 is retained in the release position with regard to the radial direction 10. To the outside in the radial direction 8, the locking element 44 projects beyond the second force-transmitting element 40 to such an extent as to protrude into the depression 72 on the first force-transmitting element 36. Consequently, the first force-transmitting element 36 can be or is supported on the second force-transmitting element 40 in the movement direction 54 via the locking element 44 in the release position, whereas the second force-transmitting element 40 can be or is supported on the first force-transmitting element 36 in the movement direction 56 via the locking element 44 in the release position. More precisely, it is the case that, in relation to the first force-transmitting element 36, the locking element 44, when in the release position, can be or is supported on the ramp section 76 of the ramp 74 in the movement direction 56, wherein the ramp section 76 and the locking elements 44 are preferably designed such that areal or linear support is generated here. In the release position of the locking element 44, a movement of the actuating piston 26 or of the first force-transmitting element 36 in the movement direction 54 is consequently transmitted via the locking element 44 to the second force-transmitting element 40 and thus also to the clutch load-exertion element 46, such that said components of the actuating device 24 are moved together in the movement direction 54 as far as the closing position as per FIGS. 3 to 6.

When the actuating device 24 reaches the closing position shown in FIGS. 3 and 4 during this process, the locking element 44 passes into the region of the second support section 60 of the support element 30. As a result, the locking element 44 is no longer supportable or supported on the outer side 62 of the first support section 58 of the support element 30, such that, with regard to the radial direction 10, the locking element 44 is no longer retained in its release position. If the pressure within the pressure chamber 28 is maintained further, this has the effect that the actuating piston 26 or the first force-transmitting element 36 is displaced or moved in the movement direction 54, displacing the locking element 44 inward in the radial direction 10 relative to the second force-transmitting element 40 or the clutch load-exertion element 46. Consequently, proceeding from the release position as per FIGS. 1 to 4, the movement of the first force-transmitting element 36 in the movement direction 54 causes the locking element 44 to be moved or displaced inward in the radial direction 10 relative to the second force-transmitting element 40, into the depression 64 of the second support section 60, and thus into the locking position shown in FIGS. 5 and 6. Here, the above-mentioned ramp 74 facilitates the displacement of the locking element 44 from the release position into the locking position. The first force-transmitting element 36 is displaced relative to the second force-transmitting element 40 to such an extent as to assume the holding position shown in FIGS. 5 and 6.

In the locking position of the locking element 44, the second force-transmitting element 40 and thus also the clutch load-exertion element 46 can be or are supported on the support element 30 in the movement direction 56 via the locking element 44, whereas the two force-transmitting elements 36, 40 are decoupled from one another with respect to the movement directions 54, 56, that is to say a restoring force acting on the clutch load-exertion element 46 and/or on the second force-transmitting element 40 in the movement direction 56 is supported, preferably exclusively, via the support element 30 but no longer, or no longer fully, via the first force-transmitting element 36 or the actuating piston 26. This is achieved by virtue of the fact that the locking element 44, when in its locking position, no longer protrudes in the radial direction 8 into the depression 72 in the first force-transmitting element 36, and instead, in the holding position as per FIGS. 5 and 6, the first force-transmitting element 36 is arranged relative to the locking element 44 such that the locking element 44 can be or is supported, so as to be retained in the locking position, in the radial direction 8 on the inner side 70 of the first holding section 66 of the first force-transmitting element 36. In the embodiment illustrated, the locking element 44 can be or is supported on the inner side 70 of the first holding section 66 perpendicular to the movement direction 54, 56, such that no support force, or at most only a small support force, acts on the first force-transmitting element 36 in the movement direction 56 via the locking element 44.

From the above description, it is clear that the actuating device 24—as illustrated in FIGS. 5 and 6—can be locked with form-fit action in the closing position. Here, the actuating device 24 is automatically locked as a result of movement of the actuating device 24 into the closing position. More precisely, it is the case here that, in the locking position of the locking element 44, the second force-transmitting element 40 is supported together with the clutch load-exertion element 46 on the support element 30 in the movement direction 56 via the locking element 44 and is thus locked, whereas the first force-transmitting element 36 and the actuating piston 26 connected thereto are decoupled from the second force-transmitting element 40 and the clutch load-exertion element 46, wherein the second force-transmitting element 40 is arranged in the force transmission path between the locking element 44 and the clutch 18. It is also evident from the above description that the locking element 44 can be moved from the release position as per FIGS. 1 to 4 into the locking position exclusively by means of an actuating force that can be or is imparted by the actuating device 24 by means of the pressure within the pressure chamber 28, without an additional actuating device being required for moving the locking element 44.

Owing to the decoupling of the first and second force-transmitting elements 36, 40, the pressure within the pressure chamber 28 no longer has to be maintained, or no longer has to be maintained fully, especially since the closing force of the clutch 18 is maintained as a result of the locking of the second force-transmitting element 40 and thus of the clutch load-exertion element 46. However, a certain residual force on the actuating piston 26 and on the first force-transmitting element 36 connected thereto should still be maintained in the movement direction 54 in order to hold the first force-transmitting element 36 in its holding position as per FIGS. 5 and 6. This applies all the more because—as is evident from the figures—a restoring element 78, in this case a spring element such as for example a plate spring, is provided for the restoring movement of the first force-transmitting element 36 out of the holding position. Owing to the restoring element 78, the first force-transmitting element 36 is moved relative to the second force-transmitting element 40 into the holding position as per FIGS. 5 and 6 counter to the restoring force of the restoring element 78. In the embodiment illustrated, the restoring element 78 is supported at one side on the clutch load-exertion element 46 and at the other side on the first force-transmitting element 36 or on the actuating piston 26 in the respective movement direction 54 and 56. If it is the intention for the actuating device 24 to be moved back into its opening position as per FIGS. 1 and 2, it is merely necessary for the residual force imparted to the actuating piston 26 to be reduced by means of a further reduction of the pressure within the pressure chamber 28, such that the restoring element 78 effects a restoring movement of the first force-transmitting element 36 in the movement direction 56 into the position as per FIGS. 3 and 4.

In the embodiment shown, the locking element 44 is preloaded outward in the radial direction 8 into the release position under centrifugal force action, such that the locking element 44 moves outward in the radial direction 8 under the action of centrifugal force in order to pass into the release position as per FIGS. 3 and 4. It is however alternatively or additionally also possible for a spring device to be provided for preloading the locking elements 44 into the release position, wherein a spring device of said type may for example be provided within the depression 64 so as to act on the locking element 44 outwardly in the radial direction 8. When said release position is reached, the above-mentioned restoring element (not illustrated) that acts on the clutch load-exertion element 46 has the effect that the clutch load-exertion element 46, the second force-transmitting element 40, the first force-transmitting element 36 and the actuating piston 26 are moved in the movement direction 56 back into the position as per FIGS. 1 and 2, wherein the movement coupling is again realized by means of the locking element 44 in the release position.

A few advantageous additions or modifications to the embodiment described above with reference to FIGS. 1 to 6 will be explained below, wherein the above description otherwise applies correspondingly.

The ramp 74 described above has only the above-mentioned first ramp section 76 which has a circle-segment-shaped contour. To facilitate the displacement of the locking element 44 from the release position into the locking position, the ramp 74 could furthermore have a second ramp section, which follows the first ramp section 76 in the axial direction 6 or in the movement direction 56 and which has a rectilinear contour or a contour deviating from that of a circle segment and on which the locking element 44 can be or is supported if appropriate in linear or punctiform fashion and along which the locking element 44 is movable or displaceable from the release position into the locking position.

In a further advantageous modification of the clutch apparatus 2 described above, a wear compensation device is provided. The wear compensation device is preferably arranged in the force transmission path between the locking element 44 and the clutch 18. This is intended to ensure that a substantially constant closing force is exerted on the clutch 18 even if wear occurs on the first force-transmitting element 36, in particular on the ramp 74, on the second force-transmitting element 40, in particular at the edge of the cutouts 42, on the locking element 44 itself, and/or on the clutch 18. The wear compensation device is preferably elastically deformable in order to realize wear compensation and/or is elastically deformed in the locking position of the locking element 44 as per FIGS. 5 and 6. It would accordingly be possible, if the second force-transmitting element 40 and the clutch load-exertion element 46 are formed separately from one another, for a wear compensation device of said type to be formed for example by an elastically deformable or resilient element between the second force-transmitting element 40 and the clutch load-exertion element 46. Here, it has proven to be advantageous for the wear compensation device to be formed by the clutch load-exertion device 46 itself, which for this purpose is designed to be elastically deformable or resilient in the movement direction 54, 56 or in the axial direction 4, 6. It would accordingly be possible for the clutch load-exertion element 46 to be of elastically deformable or resilient form in the region of the radial section 48, for example. Here, it has proven to be particularly advantageous for the clutch load-exertion element 46, if appropriate the radial section 48 thereof, to be formed in the manner of a plate spring, wherein in this case, it is in turn preferable for the second force-transmitting element 40 and the clutch load-exertion element 46 to be formed separately from one another.

In the embodiment described above as per FIGS. 1 to 6, the locking element 44, when in the release position, is offset outwardly in the radial direction 8 in relation to the locking position thereof. In a further advantageous modification, however, the actuating device 24 may be designed such that the locking element 44, when in the release position, is offset inwardly in the radial direction in relation to its locking position, such that the locking element 44 must be offset outwardly in the radial direction 8 in order to pass from the release position into the locking position. It would then correspondingly be necessary for the support element 30 to surround the force-transmitting element 36 at the outside in the radial direction 8, with the second force-transmitting element 40 being situated in between. Here, however, there is the risk of the locking element 44 being preloaded not into the release position but into the locking position under centrifugal force action. To counteract this, and thus nevertheless realize a preload of the locking element 44 into the release position situated further inward in the radial direction 10, it is preferable for the spring device already mentioned above to be provided for preloading the locking element 44 inward in the radial direction 10. To achieve this in a particularly simple manner, the at least two locking elements 44 are connected to one another in annular form by means of spring elements, particularly preferably tensile and/or helical springs, of the spring device, the spring force of which generates a preload of the locking elements 44 inward in the radial direction 10 and thus a preload of the locking elements 44 into the release position.

LIST OF REFERENCE SIGNS

2 Clutch apparatus
4 Axial direction
6 Axial direction
8 Radial direction
10 Radial direction
12 Circumferential direction
14 Circumferential direction
16 Axis of rotation
18 Clutch
20 Wet chamber
22 Clutch housing
24 Actuating device
26 Actuating piston
28 Pressure chamber
30 Support element
32 Radial section
34 Axial section
36 First force-transmitting element
38 Free space
40 Second force-transmitting element
42 Cutouts
44 Locking element
46 Clutch load-exertion element
48 Radial section
50 Axial section
52 Actuating finger
54 Movement direction
56 Movement direction
58 First support section
60 Second support section
62 Outer side
64 Depression
66 First holding section
68 Second holding section
70 Inner side
72 Depression
74 Ramp
76 Ramp section
78 Restoring element.

The invention claimed is:

1. A clutch apparatus comprising:
at least one clutch pack;
an actuating device for actuating the clutch pack, the actuating device being movable from an opening position, in which the clutch pack is open, into a closing position, in which the clutch pack is closed, wherein the actuating device comprises a piston and a pressure chamber, the piston being responsive to hydraulic pressure in the pressure chamber and wherein the piston comprises a force-transmitting element with a ramp section formed on the force-transmitting element;
an annular part extending between the force-transmitting element and the clutch pack that transmits force from the force-transmitting element and exerts a load onto the clutch pack;
a restoring element exerting a restoring force on the piston through the force-transmitting element, the restoring force acting to oppose the hydraulic pressure, wherein the actuating device is lockable under operation of the ramp section, in the closing position; and
a support element that defines the pressure chamber and houses the clutch apparatus, wherein the piston has a piston head adjacent the pressure chamber, the piston head contacts the support element, and the piston has an inner side in stepped relation to the piston head so that the force transmitting element is spaced away from the support element and the force transmitting element extends in the axial direction over the annular part, wherein a free space is defined in the axial direction between the piston head and the annular part, wherein the piston head remains spaced apart from the annular part with the free space being variable in size in the axial direction between the closing position and the opening position.

2. The clutch apparatus as claimed in claim 1, comprising a locking element and a support element that defines the pressure chamber and houses the clutch pack, with a depression defined by the support element, wherein the actuating device is locked automatically by the locking element as a result of movement of the actuating device into the closing position wherein the piston pushes the locking element into the depression.

3. The clutch apparatus as claimed in claim 1, wherein the annular part defines a cutout that is open, wherein the actuating device comprises a locking element which is constructed and arranged to be moved from a release position into a locking position in which the actuating device is locked, the locking element carried in the cutout and being movable from the release position into the locking position by means of an actuating force that is imparted by the actuating device.

4. The clutch apparatus as claimed in claim 3, wherein the locking element is arranged between the force-transmitting element and the annular part, the force-transmitting element and the annular part movable in a movement direction, wherein in the release position of the locking element, the force-transmitting element and the annular part are supported on one another in the movement direction via the locking element, and in the locking position of the locking element, the force-transmitting element is decoupled from the annular part in relation to the movement direction.

5. The clutch apparatus as claimed in claim 4, wherein, in the locking position of the locking element, the force-transmitting element is movable relative to the annular part into a holding position in which, with the locking element being retained in its locking position, the locking element is supported on the force-transmitting element perpendicular to the movement direction without generating a supporting force acting on the force-transmitting element in the movement direction, the force-transmitting element being movable relative to the annular part into the holding position counter to the restoring force of the restoring element.

6. The clutch apparatus as claimed in claim 4, comprising a support element that houses the clutch pack, wherein the force-transmitting element and the annular part are movable relative to the support element in the movement direction when the locking element is in the release position, wherein, in the locking position of the locking element, the annular part is arranged in the force transmission path between the locking element and the clutch pack, and is supported on the support element in the movement direction via the locking element, so that the annular part is locked to the support element while the force-transmitting element remains moveable relative to the support element.

7. The clutch apparatus as claimed in claim 6, wherein the support element has, in relation to the movement direction, a first support section, on which the locking element can be supported so as to be retained in its release position, and a second support section, in which there is provided at least one depression into which the locking element can be moved so as to reach the locking position, the locking element, when in the region of the second support section, is moved into the depression as a result of a movement of the force-transmitting element relative to the annular part in the movement direction.

8. The clutch apparatus as claimed in claim 4, wherein the ramp section, has a circle-segment-shaped contour on which the locking element, when in the release position, is supportable in the movement direction, and a second ramp section, which follows the first ramp section and which has a rectilinear contour and on which the locking element is supportable, and along which the locking element is movable from the release position into the locking position.

9. The clutch apparatus as claimed in claim 4, wherein the annular part has at least two cutouts with a locking element corresponding to each cutout and received therein so as to be spaced apart from one another in the circumferential direction and so as to be movable in the radial direction.

10. The clutch apparatus as claimed in claim 3, wherein the locking element is preloaded into the release position, under centrifugal force action of the clutch apparatus.

11. The clutch apparatus as claimed in claim 3, wherein the annular part is elastically deformable for compensation of wear at the locking element, at the force-transmitting element and at the clutch.

12. A clutch apparatus comprising:
a clutch;
a piston actuating the clutch, the piston comprises a piston head and a force-transmitting element that has a ramp section formed on the force-transmitting element
an annular part extending between the force-transmitting element of the piston and the clutch that transmits force from the force-transmitting element and exerts a load onto the clutch, the annular part defining a cutout containing a locking element, and wherein the annular part is lockable under operation of the ramp pushing the locking element into a mating depression when the clutch is applied; and
wherein the clutch apparatus is moveable between a closing position and an opening position, and comprising a support element that defines the pressure chamber and houses the clutch apparatus, wherein the piston head is acted on by a pressure in the pressure chamber, wherein the piston head contacts the support element, and the piston has an inner side in stepped relation to the piston head so that the force transmitting element is spaced away from the support element and the force transmitting element extends in an axial direction over the annular part, wherein a free space is defined in the axial direction between the piston head and the annular part, wherein the piston head remains spaced apart from the annular part with the free space being variable in size in the axial direction between the closing position and the opening position.

13. The clutch apparatus as claimed in claim 12 wherein the annular part comprises a second force-transmitting element and a clutch load exerting element, wherein the second force-transmitting element includes the cutout, and the clutch load exerting element engages the clutch and is elastically deformable to compensate for wear in the clutch apparatus.

14. The clutch apparatus as claimed in claim 13 wherein the piston holds the locking element in the depression when in a holding position, and comprising a restoring element extending from the force-transmitting element to the clutch load exerting element, the restoring element formed as a plate spring to apply restoring movement force to the force-transmitting element to move it out of the holding position.

15. The clutch apparatus as claimed in claim 14 wherein the restoring element applies a first force to the force transmitting element and the annular part applies a second force to the locking element, wherein the first force is less than the second force, and wherein the first force is applied to the force transmitting element when the force transmitting element is in the holding position and the second force is applied to the support element through the locking element when the force transmitting element is in the holding position.

16. The clutch apparatus as claimed in claim 12 comprising a support element that houses the clutch, the support element defining a pressure chamber within which a pressure acts on the piston head, and the support element defining the depression.

17. The clutch apparatus as claimed in claim 12 wherein the annular part includes multiple actuating fingers that contact the clutch, wherein a force to actuate the clutch is transmitted from the piston head through the force-transmitting element, the locking elements, and the annular part, and is transferred to the clutch by the actuating fingers.

18. The clutch apparatus as claimed in claim 12 wherein two axial directions are defined by an axis about which the clutch rotates, the axial directions directed opposite one another, two radial directions are defined radially relative to the axis and opposite one another, and two circumferential directions are defined around the axis and opposite one another, wherein the annular part extends in either circumferential direction completely around the axis, and wherein the annular part has a second force-transmitting element extending in one axial direction, the annular part has a radial section extending from the second force-transmitting element in one of the radial directions that is away from the axis, and the annular part has multiple actuating fingers extending from the radial section on an opposite side thereof from the second force-transmitting element, the actuating fingers extending from the radial section in the opposite axial direction as compared to the second force-transmitting element, and the actuating fingers contacting the clutch.

* * * * *